(12) United States Patent
Fuller et al.

(10) Patent No.: US 9,116,947 B2
(45) Date of Patent: Aug. 25, 2015

(54) DATA-RECORD PATTERN SEARCHING

(75) Inventors: Matthew Steven Fuller, Medfield, MA (US); Mingsheng Hong, North Billerica, MA (US); Hongmin Fan, Arlington, MA (US); Andrew Allinson Lamb, Boston, MA (US); William F. Mann, Sudbury, MA (US); Lakshmikant Shrinivas, Billerica, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 159 days.

(21) Appl. No.: 13/421,761

(22) Filed: Mar. 15, 2012

(65) Prior Publication Data

US 2013/0246433 A1    Sep. 19, 2013

(51) Int. Cl.
G06F 17/30        (2006.01)

(52) U.S. Cl.
CPC ................................ *G06F 17/30424* (2013.01)

(58) Field of Classification Search
CPC ................................................ G06F 17/30424
USPC ............ 707/740, 756, 780, 999.005, 999.006
See application file for complete search history.

(56) References Cited

U.S. PATENT DOCUMENTS

| | | | |
|---|---|---|---|
| 6,438,533 B1* | 8/2002 | Spackman et al. ............... | 706/45 |
| 6,912,526 B2* | 6/2005 | Akaboshi | |
| 6,990,487 B2* | 1/2006 | Akaboshi et al. | |
| 7,016,896 B2* | 3/2006 | Shibuya | |
| 7,447,666 B2* | 11/2008 | Wang ............................. | 706/45 |
| 7,792,814 B2* | 9/2010 | Cohen ........................... | 707/707 |
| 7,904,429 B2* | 3/2011 | Villaret et al. ................. | 707/687 |
| 8,065,336 B2* | 11/2011 | Armstrong et al. ........... | 707/794 |
| 8,170,352 B2* | 5/2012 | Sandberg ....................... | 382/229 |
| 8,260,764 B1* | 9/2012 | Gruber .......................... | 707/708 |
| 8,423,348 B2* | 4/2013 | Rehberg et al. ................... | 704/9 |
| 8,676,841 B2* | 3/2014 | Srinivasan et al. ............ | 707/780 |
| 2003/0212658 A1* | 11/2003 | Ekhaus ............................. | 707/1 |
| 2005/0022115 A1* | 1/2005 | Baumgartner et al. ........ | 715/513 |
| 2007/0047705 A1* | 3/2007 | Eskelinen ................ | 379/114.03 |
| 2007/0198727 A1* | 8/2007 | Guan ............................. | 709/228 |
| 2007/0300301 A1 | 12/2007 | Cangini et al. | |
| 2008/0301135 A1 | 12/2008 | Alves et al. | |
| 2009/0262659 A1* | 10/2009 | Sturges et al. ................ | 370/253 |
| 2009/0299987 A1* | 12/2009 | Willson ............................. | 707/4 |
| 2010/0057735 A1* | 3/2010 | Srinivasan et al. ............... | 707/6 |
| 2010/0057736 A1 | 3/2010 | Srinivasan et al. | |
| 2010/0076919 A1* | 3/2010 | Chen et al. ...................... | 706/48 |
| 2010/0293196 A1 | 11/2010 | Roy et al. | |
| 2011/0093496 A1* | 4/2011 | Bando et al. .................. | 707/769 |

(Continued)

OTHER PUBLICATIONS

"Regular Expression", Wikipedia Article, Mar. 25, 2013, pp. 1-9.

(Continued)

*Primary Examiner* — Miranda Le

(74) *Attorney, Agent, or Firm* — Hewlett-Packard Patent Department

(57) ABSTRACT

A record-pattern expression of a record pattern of data records is translated to a character-pattern expression of a character pattern. A data-record series of data records is converted to a character string in which each character in the character string corresponds to a respective data record in the data-record series. Pattern instances of the character pattern in the character string are searched to identify ordinal character positions in the character string of characters in the character pattern instances. Data records at ordinal record positions in the record series of data records corresponding to the ordinal character positions are reported.

12 Claims, 7 Drawing Sheets

(56) References Cited

U.S. PATENT DOCUMENTS

2012/0113857 A1* 5/2012 Narayanaswamy et al. .. 370/252
2012/0136874 A1* 5/2012 Milby .......................... 707/743
2012/0192163 A1* 7/2012 Glendenning et al. ........ 717/143
2012/0197887 A1* 8/2012 Anderson ..................... 707/736

OTHER PUBLICATIONS

Cohen, N.H. et al.; "Eventscript: an Event-processing Language Based on Regular Expressions with Actions"; Jul. 2008; vol. 43; Issue 7; pp. 111-120.
Goodall, C.; "Data Analysis by Regular Expressions and the Analysis of Event Sequences"; AT&T Labs; p. 87-88.

* cited by examiner

DATA-RECORD PATTERN SEARCHING

BACKGROUND

Computer, storage, and networking technologies have made vast quantities of information readily available. Queries can be used to limit the amount of information to be viewed for a particular purpose. For example, one might want to select, from a database of automobile accident records, accidents involving a particular brand and model of automobile and in which an airbag deployed. To this end, one can define a query specifying the brand and model and the condition that deployment of an airbag was reported. A database engine could return all accident records meeting the query pattern. Analysis could then be applied to the subset of automobile accident records of interest, which might be a small subset of the automobile accident records of interest.

DETAILED DESCRIPTION

For selection criteria involving relations among data records, existing query procedures may be inadequate or perform poorly. For example, in a case where A and B are types of data records describing different types of events, one might wish to select data records for cases in which A is followed by B, but not other instances of A or B. For another example, one might wish to select instances of a pattern AB+C, where B+ is any counting number of Bs. The challenge is to provide a system that can handle a variety of data-record patterns that might be of interest.

Figure 1:
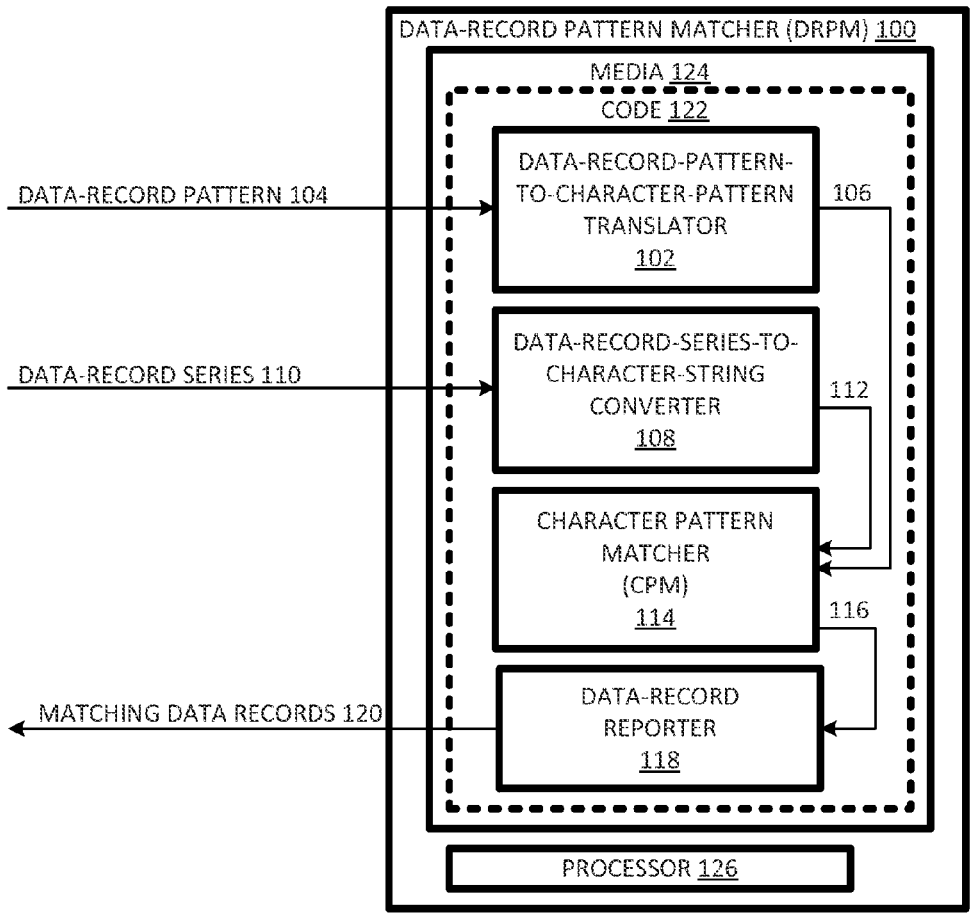
FIG. 1 is a schematic diagram of an example data-series pattern matcher.
Figure 2:
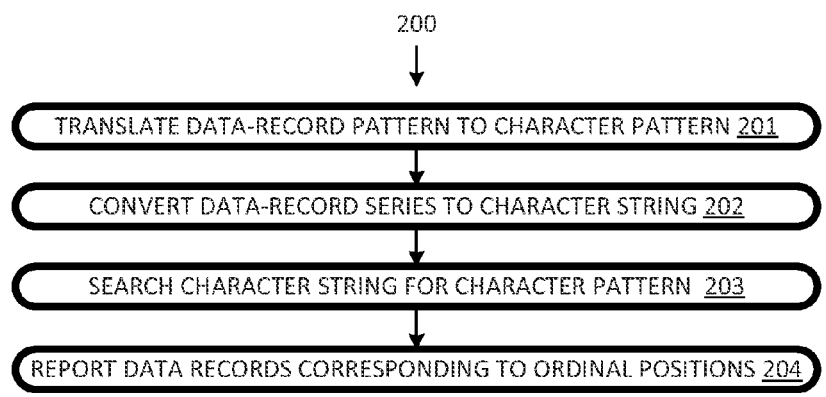
FIG. 2 is a flow chart of an example data-series pattern-matching process.

Data-record pattern matcher (DRPM) system 100, shown in FIG. 1, addresses this challenge by implementing a process 200, flow charted in FIG. 2. At 201, a data-record pattern is translated to a character pattern. At 202, a data-record series is converted to a character string. At 203, the character string is searched for matching character-pattern instances of the character pattern. At 204, data records at ordinal data-record positions in the data-record series corresponding to the identified character ordinal positions are reported. Herein, "reported" encompasses scenarios in which the data records themselves or their identities (e.g., record numbers, pointers to the data records, etc.) are returned in response to a query. Data records corresponding to non-matching character instances in the character string are not returned.

By converting a data-record pattern query into a character-pattern query, DRPM system 100 avails itself of a mature set of character-pattern (aka, "regular expression") matching tools. These mature tools can cover a range of data-record-series queries, relieving a developer of the burden of reinventing matching search techniques for which character-based analogs already exist.

Accordingly, data-record pattern matcher system 100 includes programmable hardware components including: data-record-pattern-to-character-pattern translator 102 for converting a data-record pattern 104 to a character pattern 106; a data-record-series-to-character-string converter 108 for converting a data-record series 110 to a character string 112; a character-pattern matcher 114 for identifying ordinal character positions 116 in character string 112 of characters in pattern matching instances of character pattern 106; and a data-record reporter 118 for reporting matching data records 120 at ordinal data-record positions corresponding to the ordinal character positions. Components 102, 108, 114, and 118 may be defined in part by code 122 encoded in media 124 and executable by a processor 126.

Herein, a "data record" is a set of associated data elements. Examples of data records include database records, e.g., rows in a database table, and log entries in a log file. Herein, a "data-record series" is an ordered set of data records. For example, each data record can correspond to an event and the events can be ordered by time of occurrence in the data-record series; in such cases, the data series can be considered "event series". In other examples, data records can be ordered according to a parameter other than time, e.g., price, spatial position, wins, etc. Also, data records can be ordered using more than one parameter, e.g., a primary sort parameter (e.g., start time) and a secondary sort parameter (e.g., end time), e.g., to "break ties" between records having equal values for the primary sort parameter.

Herein, a "data-record type" is a category to which data records may or may not belong. For example, one data-record type might include all stock purchases of Stock S1 by anyone; alternatively, another data-record type might include purchases of Stock S1 by person P1; a third data-record type might include purchases of lots of over 100 shares of Stock S1, etc.

Herein, a "data-record pattern" is an ordinal relationship between or among plural data-record types defined in terms of a set of one or more sort parameters. For example, one can specify a data-record pattern as "Person P1 buys stock S1, then Person P2 buys stock S1, then Person P1 sells stock S1, then Person P2 sells stock S1." Such a pattern might be interesting, for example, to someone trying to determine whether person P2 is being influenced by the activities of person P1.

Herein, a "character" is one of a set of symbols to which arbitrary meanings may be mapped arbitrarily. For example, the characters can be alphabetical or ASCII (American Standard Code for Information Interchange) characters. A "character string" is an ordered series of characters. A "character pattern" is an ordinal relationship among characters. Typically, a character pattern is expressed as a "regular expression", aka, "regex" or "regexp"; for example, a character pattern can be expressed as Perl Compatible Regular Expressions (PCRE). A character-pattern matcher is a device, algorithm, or program for finding instances of a character pattern in a character string. The character-pattern matcher can be a regular expression matcher such as those available for PCRE.

Figure 3:
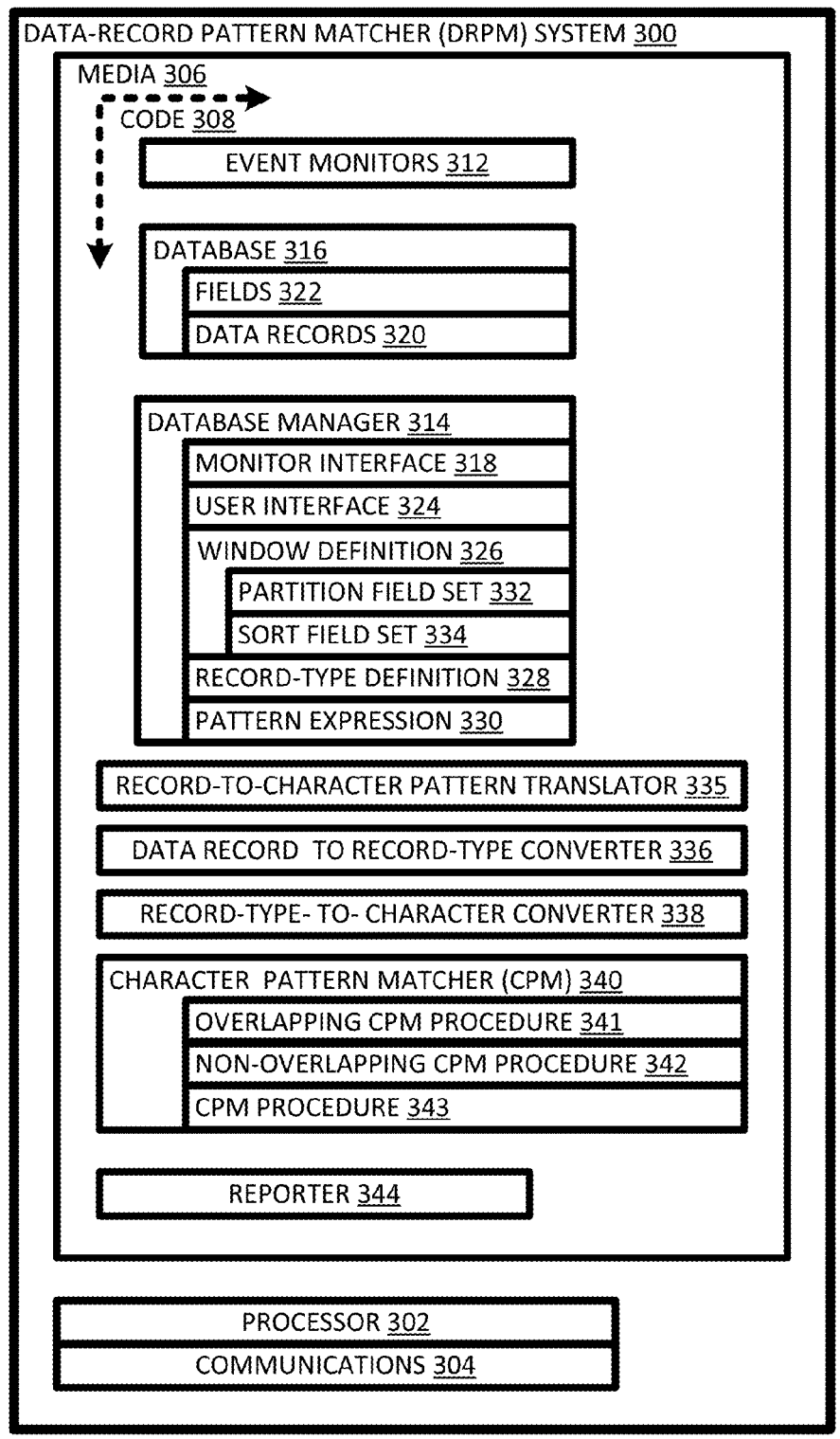
FIG. 3 is a schematic diagram of another example data-series pattern matcher.

In a data-record pattern matcher (DRPM) system 300, shown in FIG. 3, the conversion of a series of data records into a character string includes: 1) categorizing data records into record types so as to convert the series of data records into a series of record types; and 2) mapping record types to characters so as to convert the series of record types to the character string. In some embodiments, the conversion of a series of data records into a character string is performed in a single step.

DRPM system 300 provides for defining a window definition, a list of data-record type definitions, and a pattern specification to be used in data-record pattern matching. In some cases, it may be desirable to find instances of a data pattern anywhere in the available data. In other cases, one might restrict a search to a subset of available data, e.g., the most recent month. In other cases, one might divide the data records into multiple partitions for comparison purposes. For example, one might want to look for patterns separately for each state or country of interest. A window definition determines what data is to be searched and how that data is to be partitioned, if at all.

A data-record type may be defined by a predicate specification, e.g., "price≥100". A pattern specification is defined, e.g., using standard regular specification notation made up of the unique identifiers of the record-type definitions. Using these definitions, DRPM system 300 outputs zero or more pattern instances where each pattern instance includes zero or more events. DRPM system 300 includes a processor 302, communications (including input-output) devices 304, and non-transitory computer-readable storage media 306.

Media 306 is encoded with code 308 representing data including instruction-type data. Code 308, when executed, defines functionality for programmed-hardware components of DRPM system 300. These components include an event monitor 312, which can include one or more monitors for monitoring events of interest, e.g., financial transactions, travel events, network errors and accesses, weather events, etc. The monitors can be of one or more types and have one or more locations. The monitors can identify and characterize events, as well as time-stamp and location-stamp event detections to provide event data. The resulting event data can be stored as data records in a database 316. In other examples, there is no event monitor; for example, data in a database can be searched regardless of how the database was populated.

Event or other data can be provided to and collected by a database manager 314 for storing into database 316. Database manager 314 includes a monitor interface 318 for receiving the data from event monitors 312. The data in database 316 can be arranged in records 320 (e.g., corresponding to table rows) and fields 322 (e.g., corresponding to table columns), with each record corresponding to an event. The fields can be used to identify and characterize events, as well as to store time stamps and location stamps. Alternatively, data other than event data can be stored in database 316.

Database manager 314 has a user interface 324 from which queries can be received. Additionally, window definitions 326, data-type definitions 328, and event patterns 330 can be specified as part of or derived from a query. Alternatively, a window definition can be made independently of any query. A window definition can specify one or more partition fields 332 and one or more sort fields 334. A query result may provide or identify data records represented in instances of a specified pattern for a window or set of windows.

Application of a window definition to data records yields a series of data records. A data-record-to-record-type converter 336 converts the data-record series to a series of record types by applying data-type definitions 328 to categorize events. Record-type-to-character converter 338 converts the series of data-record types into a series of characters, e.g., alphabetical characters. Each record type can be assigned to a single character (e.g., A, B, C, etc.). A query can be in the form of or converted (e.g., from a natural language query) to the form of an (e.g., regex) expression indicating relations among record types. Record-type-to-character converter 338 converts such an expression to an expression of relations among characters. Pattern translator 335 is used to convert a record-pattern expression to a character-pattern expression.

Character-pattern matcher (CPM) 340 is used to detect and quantify instances of the character pattern in the character string. CPM 340 serves as a host to built-in and plug-in character pattern match procedures 341-342, including an overlapping CPM procedure 341 and a non-overlapping CPM procedure 342. Reporter 344 can take ordinal positions associated with the matches found by CPM 340 and output the corresponding original data records.

In non-overlapping CPM procedure 342, once a match is found, searching continues for the next match starting from the character immediately following the last character of the last pattern instance found. This can result in skipping of some pattern instances. For example, three instances (AAAB, AAB, AB) of a pattern A+B (any positive integer number of A's followed by a B) can be found in the string AAAB. Non-overlapping CPM procedure 342 would find AAAB, but not the other two. Since AAAB would correspond to all the data records for all three matches, the result returned by reporter 344 does not omit any records. However, there may be scenarios in which records which are part of a matching record are omitted in the report when a non-overlapping procedure is used.

Where an omission of a matching data record is a concern, overlapping CPM procedure 341 can be used. In overlapping CPM procedure 341, searches resume from the first character of the last pattern instance found. In an alternative overlapping procedure, the next ordinal start position following a previous match could be the position immediately following the start position of the previous match. Where the built-in procedures are not suitable for a particular procedure, a plug-in CPM procedure can be added and selected.

Herein, a CPM procedure is "non-overlapping" if it is not possible for one element, e.g., character, to be identified as part of more than one pattern instance. A CPM procedure is "overlapping" if it is possible for one element, e.g., character, to be identified as part of more than one pattern instance. For example, if a character instance is an element of two pattern instances, then an overlapping procedure will identify both pattern instances, while the non-overlapping procedure will identify only one pattern instance.

Figure 4:
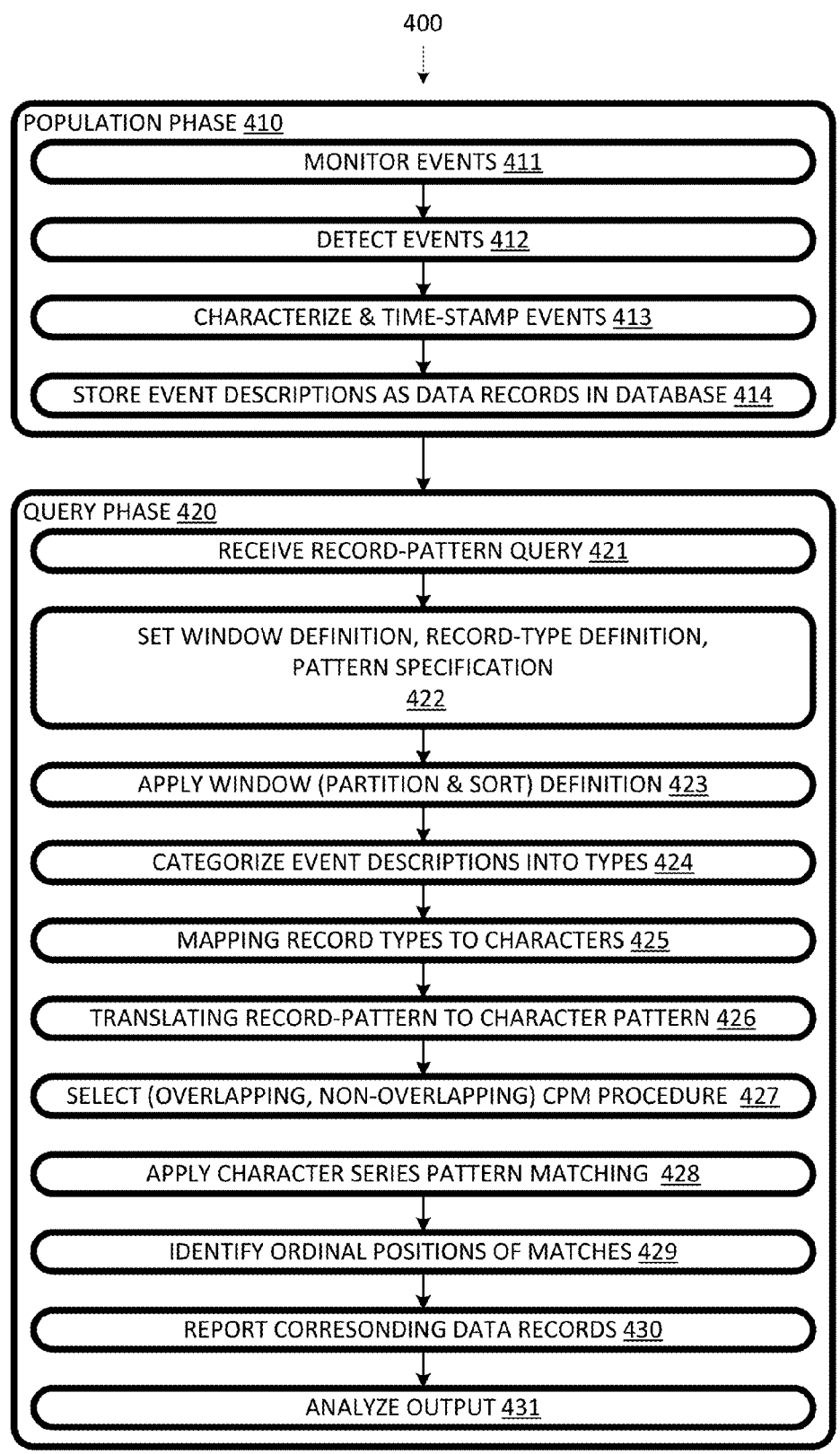
FIG. 4 is a flow chart of a data-series pattern-matching process implementable by the matcher of FIG. 3.

Code 308 of DRPM system 300 provides for a process 400, flow-charted in FIG. 4. Process 400 includes a data-population phase 410 and a query phase 420. Query phase 420 can be implemented regardless of how the data records were produced or how the database was populated.

In population phase 410, events are monitored at 411. For example, stock transactions can be monitored over multiple stock exchanges; for another example, airline reservations for various airlines through various reservation systems can be tracked. At 412, events are detected. For example, the events can be stock transfers or airline reservations. At 413, detected events are time-stamped and otherwise characterized to yield event descriptions. For example, an event description can specify a stock exchange, a stock, a price, a time and date of purchase, a purchaser, a purchaser broker, a buyer, and a buyer broker. For another example, a reservation agent, an airline, a flight number, a departure location, an arrival location, and a passenger name may be specified.

At 414 event descriptions are stored as data records into and in a database. Herein, "stored into" implies a storing action, while "stored in" implies a stored state. The database can include one or more tables in which data can be arranged in records (e.g., rows) and fields (e.g., columns). Each record can include an event description. Each field can correspond to a description parameter such as stock price or destination location. Thus, the different parameters of an event description are located within respective fields and within the same record.

Query phase 420 begins at 421 with a user or other program submitting, and DRPM system 300 receiving, a data-record pattern query. For example, a query might be "How many times in in 2011 did person A buy stock A, then sell stock A, then buy stock B?" Another query, "How many times in July. 2011 did passengers take airline A from location L1 to location L2 and then take airline B from location L2 to location L3?" Queries may be submitted in natural language and then translated into a standard query language such as Structured Query Language (SQL).

At 422, a window definition, which may include a partition definition and a sort definition, is set. Such definitions may be derived from the query of 421. For example, the aforementioned query can include a partition limited to person A, and data within that partition can then be arranged by time stamp to yield a time series of stock transactions by person A. Alternatively, the definitions may be set in some other way, in which case they may or may not be set before the query is made. In some cases, a definition may involve separate steps, some of which may or may not occur before the query. The result of 422 is one or more partitions including respective series of data records.

At 423, the data records are partitioned and ordered as defined by the window definition. The window definition may use the semantics as defined by the "over clause" as defined by the SQL (Structured Query Language) standard. The order permits pattern matching searches for patterns on an ordered sequence of data records.

Figure 5:
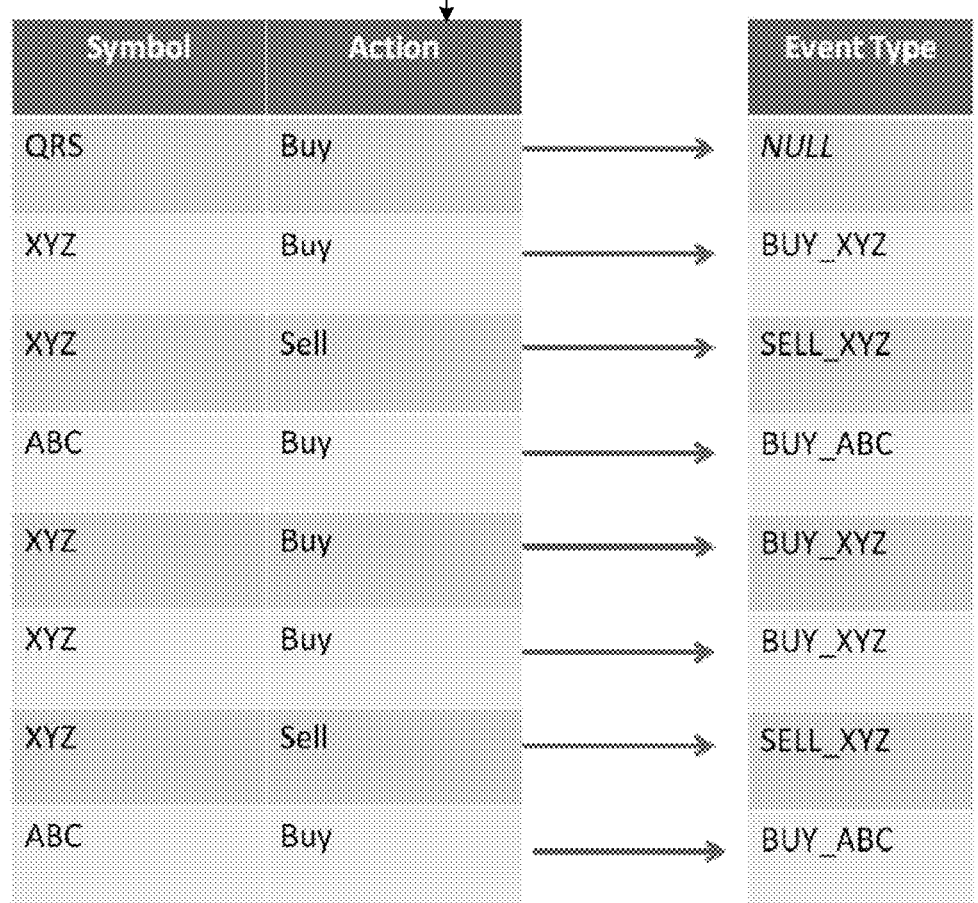
FIG. 5 depicts a mapping of data records to record types occurring in the process of FIG. 4.
Figure 6:
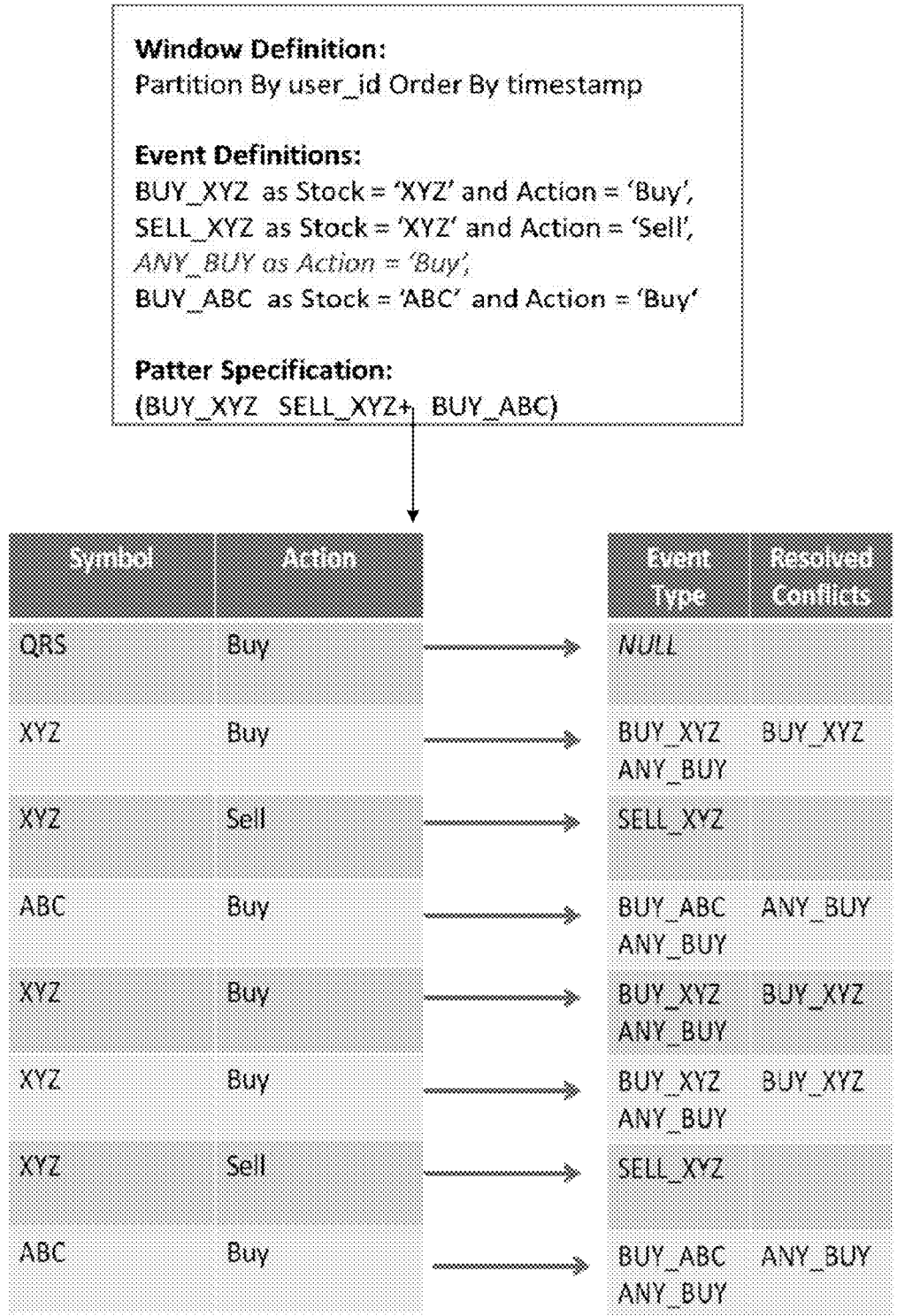
FIG. 6 depicts another mapping of data records to record types.

For example, in the setting shown in FIG. 5, the window definition specifies to partition by user_id and sorts each partition by timestamp. Three data record types are defined. For example, BUY_XYZ specifies the event where the column "Stock" equals the value "XYZ" and the column "Action" equals the value "Buy". Finally, the pattern specification specifies the record pattern to be found. In one example, the pattern starts with an event BUY_XYZ followed by one or more SELL_XYZ events and ending with a BUY_ABC event. An alternative set of definitions and their implications for mapping data records to record types is shown in FIG. 6.

At 424, data records, e.g., event descriptions, in each database partition are categorized into record types according to the applicable event definition, which may be derived from a query or other source. While each data record may be unique (differing from each other by at least one field, e.g., time stamp value), multiple data records can be of the same type.

Figure 7:
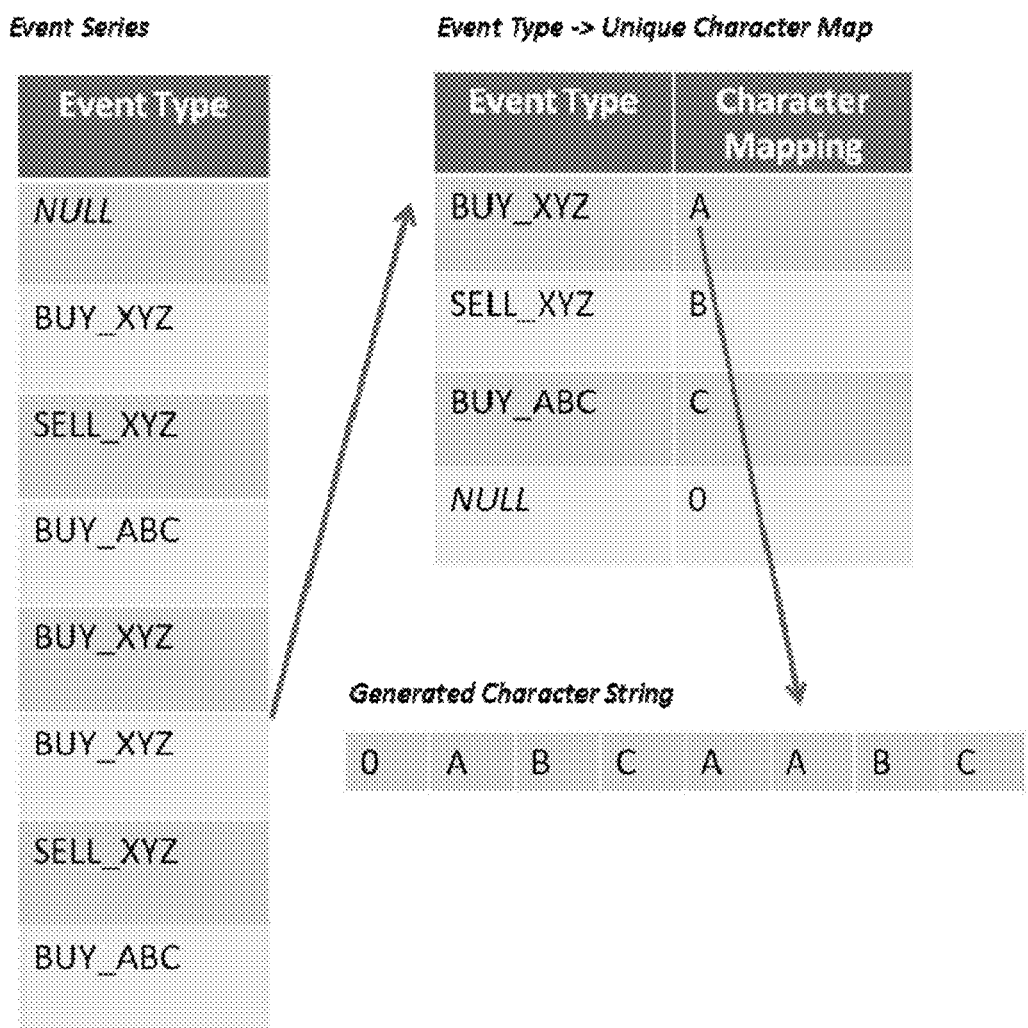
FIG. 7 depicts actions in which a data series is converted to a character string as provided by the process of FIGS. 4 and 5.
Figure 8:
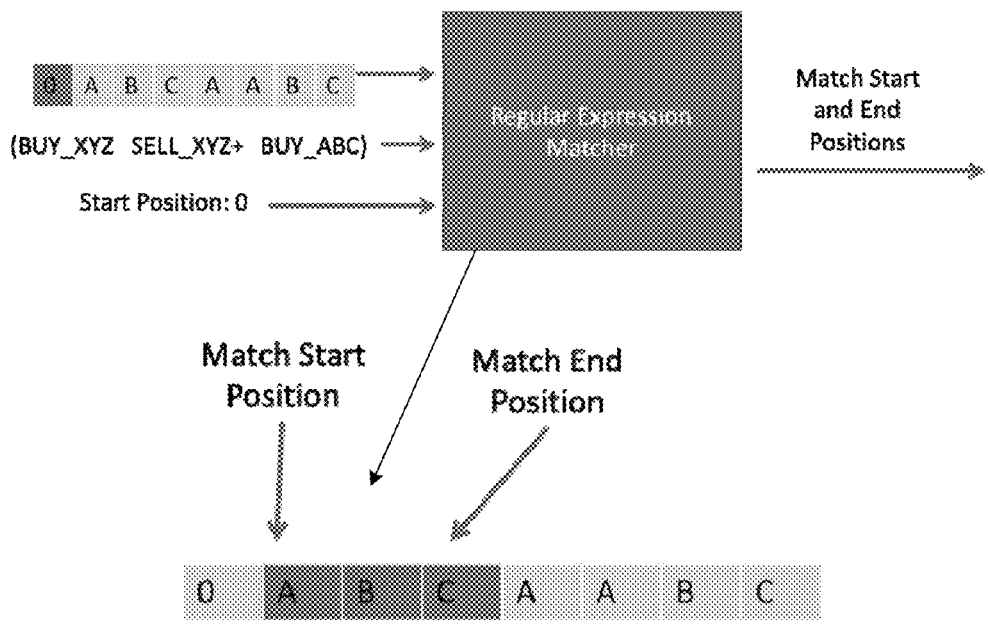
FIG. 8 depicts a portion of the process of FIG. 4 in which a first match is found.
Figure 9:
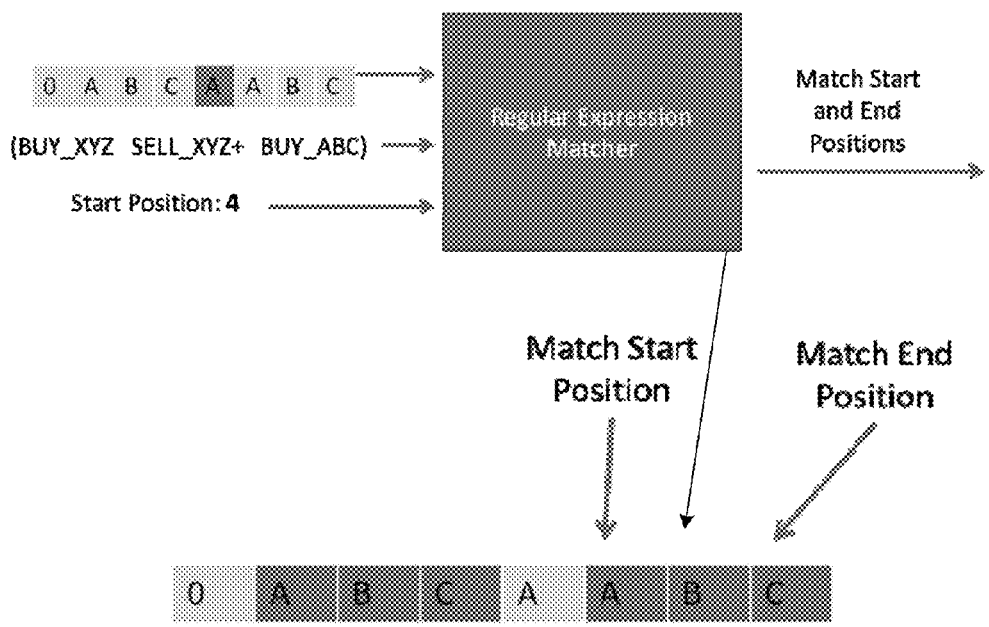
FIG. 9 depicts a portion of a process of FIG. 4 in which a second match is found.

Each record type may be given a label having one or more characters. For example, as indicated in FIG. 7, for each input row into DRPM system 300, each record's predicate specification is evaluated. If the predicate specification yields a TRUE result for that row, the row is considered to be of that event and is represented by the label for the data record. A row may be zero or more record types. Categorization criteria for record types may or may not be mutually exclusive. In other words, depending on the scenario, it may or may not be possible for one record to qualify as being of more than one type.

At 425, a record-type series is converted to a character string, e.g., by mapping record types to corresponding single characters, e.g., alphabet characters. Depending on the number of record types involved, basic, 8-bit, 16-bit, or other character systems can be used. The result of 425 can be a string of characters, with each character corresponding to a data record; the position of each character in the string corresponds to the position of the respective record in the data-record series. In other words, the $i^{th}$ character in the string is the unique alphabetical character that maps to the record type at the $i^{th}$ row of the record-type series. Multiple occurrences of a character in the character string correspond to multiple event descriptions of the same event type. Note that 424 and 425 can be merged by mapping data records directly to types represented by respective characters.

If the record-type criteria are not mutually exclusive, it is possible that a data record might belong to more than one record type. To convert such an "ambiguous" data record into a single character representation, exactly one of the record types can be selected at the expense of the others. For example, the record type that was lexically defined first in the list of event definitions may be selected at the expense of record types defined later. This selection may result in some pattern instances being missed in a matching procedure. Depending on the application, such omissions may or may not be acceptable.

Where such omissions are unacceptable, or in other appropriate cases, combination record types can be defined. For example, a record type C can be defined for events meeting the criteria for both non-mutually-exclusive record types A and B. Record type A can be converted to a record type D that includes type A records not included in type C; record type B can be converted to a record type E that includes type B events not included in type C. Event types C, D, and E may then be used instead of types A and B. The result is a set of record types that are mutually exclusive (at least in the domain of the relevant database partition). In general, using more record types permits greater precision at a cost of more processing time.

At 426, the record-pattern expression query is converted to a character-pattern expression, which is a specification of relations among characters (corresponding to record types). At 427, a CPM procedure is selected. The selected procedure may be an overlapping procedure, a non-overlapping procedure, or another type of CPM procedure.

At 428, a character-string pattern matching technique is applied to detect instances of the character pattern in the character string. The ordinal character positions of the characters in the matches can be identified at 429. The data records at ordinal record positions corresponding to the identified ordinal character positions can be reported at 430. Further analysis, e.g., statistical and summary operations, may be performed on the matching data records at 431.

The character pattern matcher can be given the character-pattern specification, the character string, and the ordinal character position that will serve as the starting place in the string for the matcher to search for matches. Positions preceding the start position are not considered during matching in this example. The matching process can be rerun starting with new ordinal positions; in the case of non-overlapping CPM procedure 342, the process can be rerun with an ordinal start position at the character position immediately following the position of the last character in the previous pattern match. If no previous match was found, the start position would be the immediate next position in the character string.

Alternatively, overlapping CPM procedure 341 may be implemented. In this case, instead of having the next ordinal start position at the position immediately following the end position of the previous pattern match, the next ordinal start position could be the position immediately following the start position of the previous match.

Herein, a "predicate" is a statement that can be true or false depending on the values of its variables. For example: "price >100" is a predicate. If the value of the price field in the data record is greater than 100, the result is true. Otherwise, the statement is false. Predicates can be used as part of a data record to record-type converter. Each record type is defined by a predicate. So a record is a particular record type if the predicate evaluates to true.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation.

"Storage medium" and "storage media" refer to a system including non-transitory tangible material in or on which information is or can be physically encoded so as to be readable, e.g., by a computer. The information can include instructions and non-instruction-type data. Herein, "processor" refers to a hardware device or a combination of hardware devices that can execute instructions encoded in storage media. Herein, all combinations of hardware and software capable of achieving a stated result are considered functional equivalents for claim purposes.

In this specification, related art is discussed for expository purposes. Related art labeled "prior art", if any, is admitted prior art. Related art not labeled "prior art" is not admitted prior art.

The illustrated and other described embodiments, as well as modifications thereto and variations thereupon are within the scope of the following claims.

What is claimed is:

1. A computer-implemented process comprising:
   translating a record-pattern expression of a data-record pattern of data records to a regular expression of a character pattern, said character pattern being an ordinal relationship among plural characters, said data-record pattern being an ordinal relationship among plural data-record types, said ordinal relationship being defined at least in part in terms of a sort parameter;
   converting each data record in a record series to a respective character instance in a character string of characters such that, for each data record in said record series, an ordinal record position of the data record in said record series corresponds to an ordinal character position of the respective character instance in said character string;
   searching for character-pattern instances of the character pattern in the character string to identify ordinal character positions in the character string of characters in the character-pattern instances, each of said character-pattern instances corresponding to a respective instance of said data-record pattern; and reporting data records at ordinal record positions in the record series of data records, the ordinal record positions corresponding to the ordinal character positions, wherein the converting includes:
   converting the record series into a record-type series by categorizing the data records into record types; and
   converting the record-type series to the character string by mapping record-types to characters.

2. A process as recited in claim 1 wherein the searching implements an overlapping character-pattern matching procedure.

3. A process as recited in claim 2 wherein the searching implements a non-overlapping character-pattern matching procedure such that, once a match is found, searching continues for the next match starting from the character immediately following the last character of the last pattern instance found.

4. A process as recited in claim 3 further comprising:
   monitoring events;
   detecting events;
   characterizing and time-stamping events; and
   storing event descriptions as data records including time stamps into a database.

5. A system comprising:
   a processor;
   a programmed hardware record-pattern-to-character-pattern translator to convert a record-pattern expression representing a data-record pattern of data records to a regular expression representing a character pattern of characters, said character pattern being an ordinal relationship among plural characters, said data-record pattern being an ordinal relationship among plural data-record types, said ordinal relationship being defined at least in part in terms of a sort parameter;
   a programmed hardware record-series-to-character-string converter to convert each data record in a record series of data records to a respective character instance in a character string of characters such that, for each data record in said record series, an ordinal record position of the record in said record series corresponds to an ordinal character position of the respective character instance in said character string;
   a programmed hardware character-series pattern matcher to search the character string to identify ordinal character positions of characters in character-pattern instances of the character pattern in the character string, each of said character-pattern instances corresponding to a respective different data-record-pattern instance of said data-record pattern; and
   a programmed hardware record reporter for reporting data records at ordinal record positions in the record series corresponding to the ordinal character positions identified by the character-series pattern matcher wherein the record-series-to-character-string converter includes:
   a record-to-type converter to convert the record series to a record-type series of record types by categorizing data records according to record types; and
   a record-type-to-character converter to convert the record-type series to the character string by mapping record types to respective characters.

6. A system as recited in claim 5 further comprising:
   a database for storing data records; and
   a database manager to partition data records stored in said database to define a partition including only data records in the record series.

7. A system as recited in claim 6 wherein the character pattern matcher includes a non-overlapping character-pattern match procedure such that, once a match is found, searching continues for the next match starting from the character immediately following the last character of the last pattern instance found.

8. A system as recited in claim 6 wherein the character pattern matcher includes an overlapping character-pattern match procedure.

9. A non-transitory computer-readable storage medium storing instructions that, when executed by a processor, cause the processor to:
   translate a record-pattern expression of a data-record pattern of data records to a regular expression of a character pattern, said character pattern being an ordinal relationship among plural characters, said data-record pattern being an ordinal relationship among plural data-record types, said ordinal relationship being defined at least in part in terms of a sort parameter;

convert each data record in a record series of data records to a character instance in a character string such that, for each data record in said record series, an ordinal record position of the data record in said record series corresponds to an ordinal character position of the respective character in said character string;

search for character-pattern instances of the character pattern in the character string to identify ordinal character positions in the character string of characters in the character-pattern instances, each of said character-pattern instances corresponding to a respective data-record-pattern instance of said data-record pattern; and report data records at ordinal record positions in the record series of data records corresponding to the ordinal character positions, wherein the converting of a record series includes:

converting the record series into a record-type series by categorizing the data records into record types; and converting the record-type series to the character string by mapping character-types to characters.

10. A medium as recited in claim 9 wherein the data records are event descriptions.

11. A medium as recited in claim 10 wherein the data records specify times of occurrence for respective events.

12. A medium as recited in claim 11 wherein the data records are arranged in chronological order of the times of occurrence.

* * * * *